United States Patent [19]

Laverty, Jr.

[11] Patent Number: 4,793,588

[45] Date of Patent: Dec. 27, 1988

[54] FLUSH VALVE WITH AN ELECTRONIC SENSOR AND SOLENOID VALVE

[75] Inventor: Martin J. Laverty, Jr., Earlysville, Va.

[73] Assignee: Coyne & Delany Co., Charlottesville, Va.

[21] Appl. No.: 183,042

[22] Filed: Apr. 19, 1988

[51] Int. Cl.⁴ .................. F16K 31/02; F16K 31/126
[52] U.S. Cl. .................................. 251/30.03; 4/302; 4/304; 4/305; 4/DIG. 3; 251/30.05; 251/45
[58] Field of Search ............ 251/30.03, 30.05, 45, 251/46; 4/249, 302, 303, 304, 305, DIG. 3

[56] References Cited

U.S. PATENT DOCUMENTS

| | | | |
|---|---|---|---|
| 1,614,468 | 1/1927 | Haas | 251/46 |
| 3,079,952 | 3/1963 | Miller | 251/30.04 |
| 3,202,396 | 8/1965 | Delany et al. | 251/45 |
| 3,291,439 | 12/1966 | Goldstein | 251/46 |
| 3,493,008 | 2/1970 | Scaglione | 251/46 |
| 4,295,631 | 10/1981 | Allen | 251/30.03 |
| 4,309,781 | 1/1982 | Lissau | 4/DIG. 3 |
| 4,570,272 | 2/1986 | Kawaguchi et al. | 4/302 |
| 4,604,764 | 8/1986 | Enzo | 4/305 |
| 4,624,017 | 11/1986 | Foletta | 4/305 |

Primary Examiner—George L. Walton
Attorney, Agent, or Firm—McAulay, Fields, Fisher, Goldstein & Nissen

[57] ABSTRACT

The invention relates to flush valves in which an external operating handle is eliminated. An electronic sensor, solenoid valve and a solenoid contained within a single unit to operate a flush valve are provided which is either built into the flush valve or can be retrofitted to a conventional flush valve with an external operating handle. The solenoid valve can also be controlled by external means separate and apart from the infra-red sensor mechanism.

20 Claims, 4 Drawing Sheets

FLUSH VALVE WITH AN ELECTRONIC SENSOR AND SOLENOID VALVE

BACKGROUND OF THE INVENTION

1. FIELD OF THE INVENTION

This invention is concerned with a flush valve which is rendered operative in response to activation by an electronic sensor. More particularly, the invention is concerned with an electronic sensor and solenoid valve contained in a single unit for operating a flush valve.

2. DESCRIPTION OF THE PRIOR ART

The invention is concerned with improving the operation of a diaphragm-type flush valve which is rendered operative by means of an external handle. In a heretofore known conventional flush valve of the diaphragm-type operated by an external handle, there is a water inlet and a water outlet on a conventional flush valve, the outlet being connected to a device such as a urinal which is to be flushed; and the inlet and outlet are separated by a diaphragm so as to provide two chambers, an upper and a lower chamber, filled with water at supply line pressure.

At the start of a flushing operation, the external handle is depressed and operates an operating stem which pushes against the stem of an auxiliary valve and thereby tilts the head of the auxiliary valve off from its auxiliary valve seat. As soon as the stem of the auxiliary valve is tilted, the upper chamber releases a quantity of water into the outlet. After tilting of the stem and moving of the water from the upper chamber into the outlet, the diaphragm is completely moved off its seat, which diaphragm normally closes off the outlet of the flush valve, and then the inlet and lower chamber provide for a continuous flow of a quantity of water from the lower chamber into the outlet of the flush valve. This takes place because when water from the upper chamber is released into the flush valve outlet, pressure in the upper chamber is reduced, and pressure in the lower chamber forces the diaphram in an upward direction so as to connect the inlet and outlet directly and water flows from the inlet directly into the outlet. In one of the conventional well-known type of flush valves, the diaphragm rises upward until its stroke is halted by contact with the valve cover or a regulating screw in the valve cover. At this time, the valve is now fully opened and the auxiliary valve is perpendicular and reseated onto the axuiliary valve seat.

When the handle is released, the flushing action continues until enough water enters the upper chamber through a bypass orifice in the diaphragm to refill the upper chamber and equalize the pressure to that of the lower chamber. The area of the diaphragm subject to pressure on the upper side of the diaphragm is greater than the area subject to pressure on the lower side. Therefore once the pressure has been equalized, the diaphragm begins to slowly descend to the main valve seat and closes off the flow of water and completes the cycle.

A further object of the invention is to provide a solenoid valve and a solenoid valve body therefor for a sensor operated flush valve to render the flush valve operable.

Yet another object of the invention is to provide a replacement operating mechanism for a standard manufacturers flush valve and replace the conventional cover with a novel replacement cover and control module containing a solenoid valve and a sensor module, and a solenoid valve controlled by the solenoid and which cooperates with the cover and the remainder of the conventional flush valve.

To these ends the invention consists in the provision of a sensor operated flush valve, such as for a urinal or a water closet, in which the flush valve has a valve body with a water inlet and a water outlet, and a valve body cover for the valve body, and cooperating connection elements on the valve body and the housing, respectively for holding the housing to the valve body in a water tight fitting relationship while permitting separation thereof; a diaphragm held in a fixed relationship between the valve body and the cover for separating the inlet from the outlet, and by-pass means associated with the diaphragm for permitting water under pressure supplied to the water inlet to pass into the cover; a solenoid valve associated with and an electronic component casing associated with the cover; received within the cover a solenoid housed within the component casing, a solenoid plunger associated with the solenoid and the solenoid valve; the cover having a through opening communicating with the solenoid valve, the solenoid valve including a first water passageway communicating with the interior of the flush valve passageway communicating with the outlet; the solenoid plunger cooperating with the solenoid valve to close and open the first and second passageways to cause water to flow from the first to the second passageway upon activation of the plunger and to close off the first and second passageways from each other upon deactivation of the solenoid; and an activator responsive to an external energization to activate the solenoid to move the solenoid plunger away from the solenoid valve and case the water to flow from the first passageway into the second passageway and into the outlet.

The invention also contemplates a cover and a control module housing for a conventional flush valve which is to replace the conventional cover. The cover and control module housing according to the invention includes a sensing device and a hand-free operating mechanism therefor.

With the novel cover and control module according to the invention, the flush valve is associated with an infra-red sensing device and a solenoid valve which is rendered operative in response thereto to operate a solenoid for controlling the flushing operations. The infra-red light sensor includes a transmitter for directing an infra-red light pulse towards an object, such as an individual within a particular predetermined range, and a receiving device for receiving or capturing reflections of the transmitted light pulse reflected from the object or individual within the predetermined range. In addition, circuitry is provided for converting the reflected pulse into controlled electronic signals to open and close a solenoid valve so as to operate the conventional flush valve without the use of an external handle.

It is further within the scope of the invention to control the solenoid and the solenoid valve by external means separate and apart from the infra-red sensor mechanism or in conjunction with the infra-red sensor mechanism. For this purpose, a separate transmitter can be used to transmit a signal from an external source to the electrical circuitry within the control module for operation thereof so that no external wiring goes to the control module. Moreover, the control module is operable with twenty-four volts A.C. which is connected to twenty-four volts D.C. or less and using milliamperes with small power requirements so that should a fault in the circuitry occur, there is no possibility of external shock to a user of the urinal or other device to which the flush valve is attached. This is an important safety feature over the earlier heretofore known devices.

DESCRIPTION OF THE PREFERRED EMBODIMENTS

Figure 1:
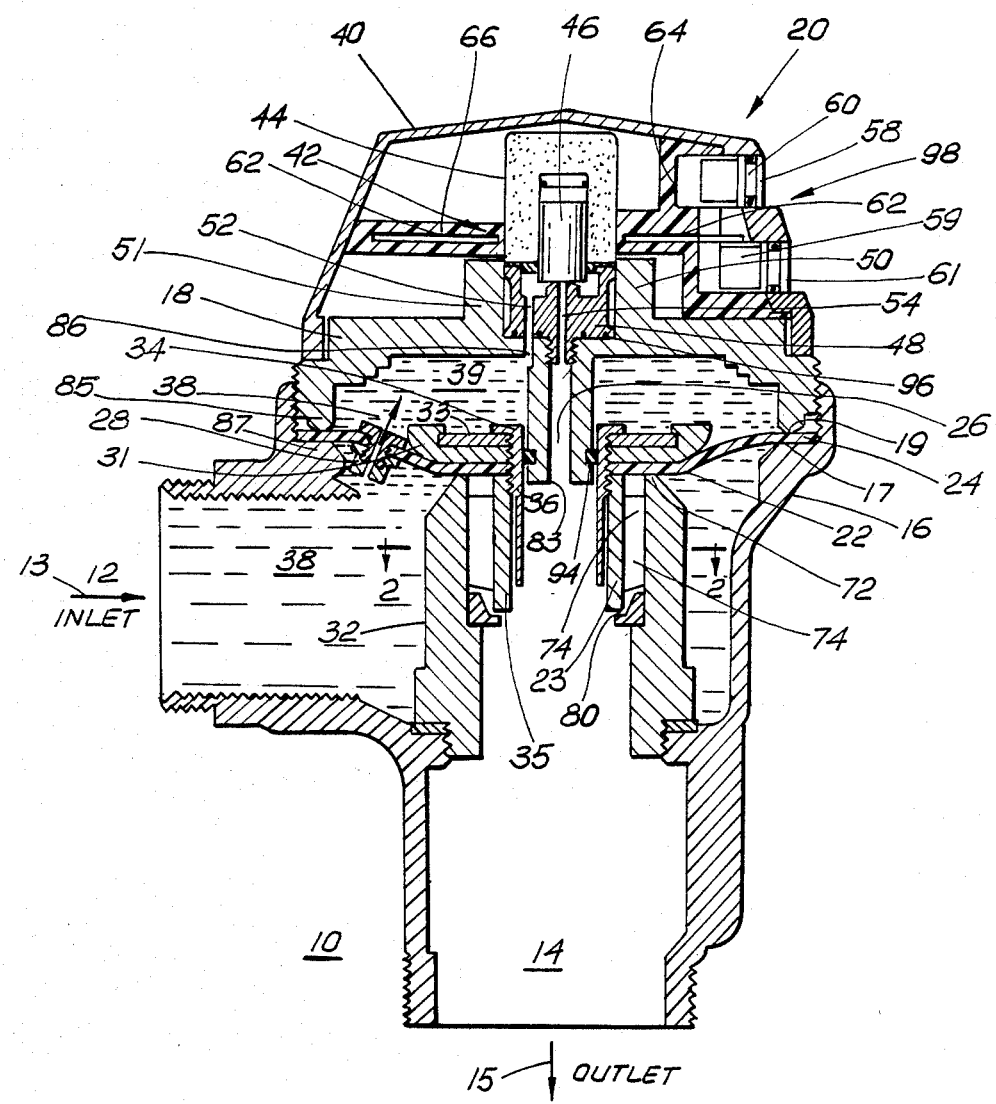
FIG. 1 is a schematic view of a flush valve in its rest or non-operating condition, partially in section with the operating handle removed and with a solenoid operated valve, a solenoid and an infra-red sensor contained within the cover to operate the solenoid valve.

Referring now more particularly to the drawings which show the presently preferred mode for carrying out the invention according to the teachings of the present invention and illustrate a flush valve 10 having a conventional water inlet 12 having an axis as shown by arrow 13 and forming a transverse axis, a conventional water outlet 14 having an axis as shown by arrow 15 forming a longitudinal axis of the flush valve, a valve body 16, and additionally including according to the invention a novel valve body cover 18, an operating or control portion or module 20 containing novel control elements as explained later.

Figure 3:
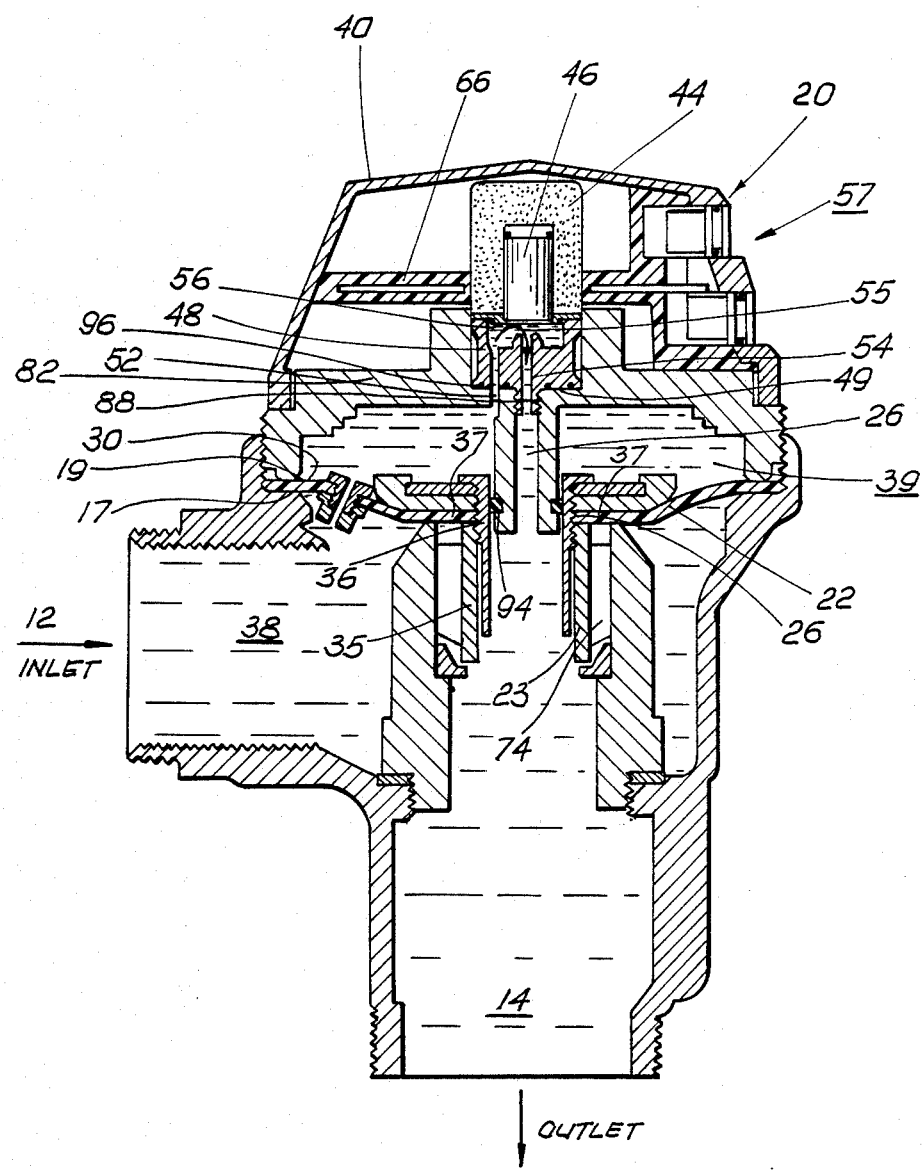
FIG. 3 is a view similar to FIG. 1, just shortly after the solenoid valve is rendered operative to move the solenoid plunger to its position to provide communication to permit the water to flow from the upper chamber into the outlet to decrease the water pressure in the upper chamber or outlet side of the diaphragm and to commence a flushing operation.
Figure 4:
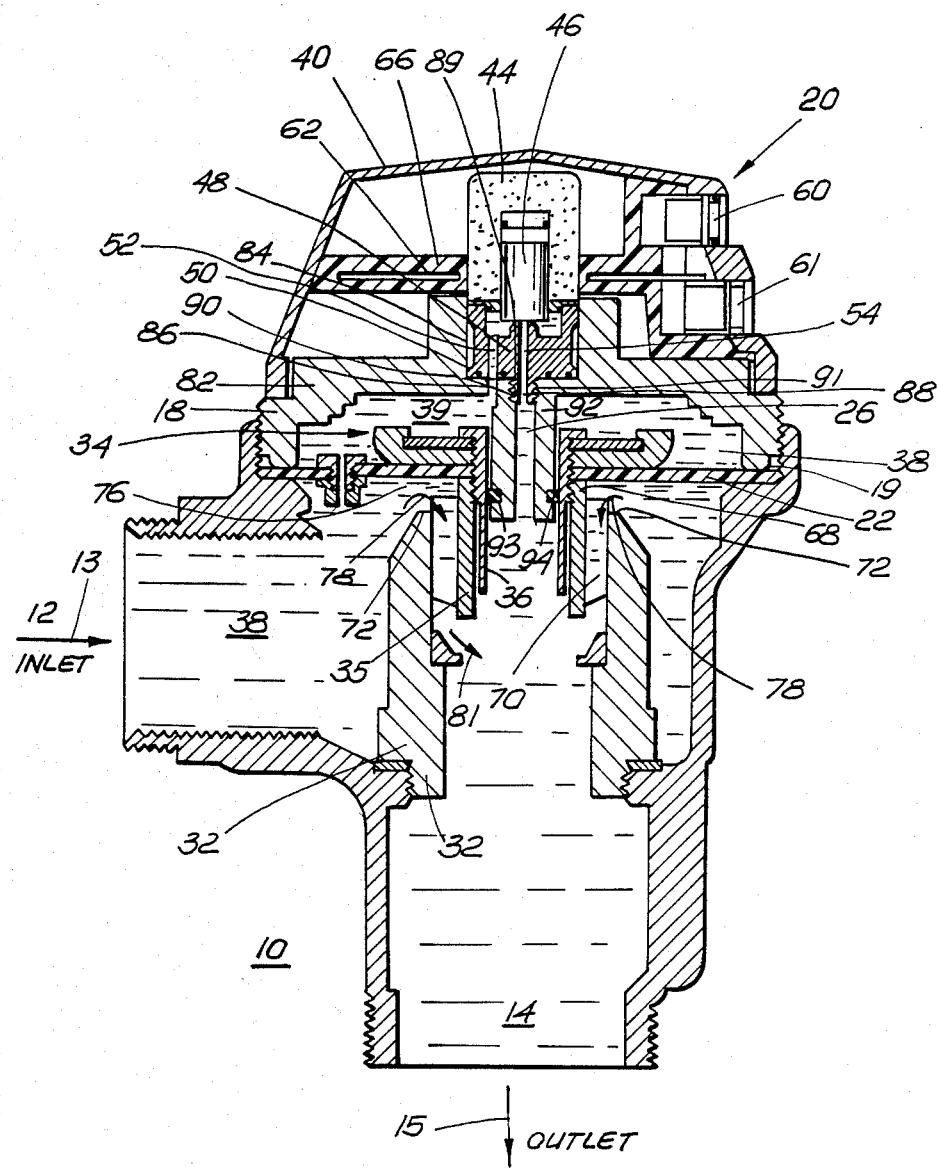
FIG. 4 is another view similar to FIG. 1 with the diaphragm in its raised position moved off from the flush valve seat showing the position of the parts during a flushing operation with water flowing from the inlet, over the flush valve seat through the passageway associated with the valve seat member and then into the outlet.

With respect to inlet 12, reference is made to U.S. Pat. No. 4,709,427 of Martin J. Laverty, Jr., entitled Disabler System for Plumbing Fixture, which is incorporated herein by reference and which shows a conventional water inlet pipe 8 and a stop control valve 51, as best seen in FIG. 4 thereof to a different type of flush valve 7, water inlet 8 and stop control valve 51, are equally usable with flush valve 10 and is connected with water inlet 12 as shown in FIGS. 1 to 4 of this invention.

In the conventional flush valve, a diaphragm 22 is held at one end 24 thereof between valve body 16 and valve body cover 18. End 24 is firmly held in a watertight manner between surface 17 on valve body 16 and sealing edge 19 on valve body cover 18. In the conventional flush valve, the conventional cover is different from novel cover 18, but the holding of the one end 24 between the novel valve body cover 18 and valve body 16 forms no part of the invention. The center portion of conventional diaphragm 22 also includes a central opening 26 that is in communication with water outlet 14. Diaphragm 22 also includes a bypass valve 28 so as to permit water to flow from inlet 12 into the volume or upper chamber 39 between an upper face 30 of diaphragm 26 and cover 18.

Flush valve 10 also includes a main valve seat member 32 and a diaphragm bushing holder 34 having a first holding portion 35 and a second holding portion 36 positioned on opposite sides of the other end 37 of diaphragm 22 proximate to and surrounding central opening 26 and positioned to hold the portion of bushing around central opening 26 in a tight manner while permitting movement of diaphragm 22 off from main valve seat 32. Diaphragm 22 divides the flush valve into a lower chamber 38 and the upper chamber 39. Diaphragm 22 forms with valve body 16 and inlet 12 the lower chamber 38. Valve body cover 18 forms with diaphragm 22 the upper chamber 39 with bypass valve 28 providing for communication between lower chamber 38 and upper chamber 39 to supply water from inlet 12 to the lower chamber 38 and thence to the upper chamber 39 through bypass valve 28 in order to fill the upper chamber 39 through diaphragm 22. When upper chamber 39 is filled, it closes off communication from inlet 12 to outlet 14 by maintaining diaphragm 22 in direct contact.

Diaphragm bushing holder 34 which includes lower or first holding portion 35, upper or second holding portion 36, a cup-shaped member 31 and a disc or metal washer 33. Cup-shaped member 31, disc 33 and upper holding portion 36 are threaded in a complementary manner to lower holding portion 35 for holding other end 37 of diaphragm 22 so that diaphragm 22 and diaphragm bushing holder 34 move as a unit.

Control module 20 positioned on valve body cover 18 includes an electronic cover 40 containing part of a solenoid valve 42 which includes a solenoid 44 for movement of and operating of a solenoid plunger 46 and a solenoid valve body 48 received within a cup-shaped opening portion 50 in valve body cover 18. Valve body cover 18 is provided with a roof portion 82 to provide for opening 50 to be aligned with solenoid valve 42 to cooperate together with diaphragm 22 and main valve seat member 32 to provide for water flow through the solenoid valve body 48 to outlet 14. Cover opening 50 is substantially U-shaped in section and includes a base 49 to support and hold the solenoid valve body 48 and a leg portion 51 which surrounds the valve body 48. Solenoid 44 fits within opening 50 and provides a watertight fit with cover 18 to prevent water from coming into contact with the inside of electronic cover 40.

Solenoid valve body 48 includes a first passageway 52 communicating between upper chamber 39 and a second passageway 54 having one end proximate to plunger 46 and closed off by plunger 46 which is held by gravity against solenoid valve body 48, and its other end communicating with and opening to outlet 14. When solenoid 44 is activated, plunger 46 is raised and is moved in a vertical direction so as to be drawn upwardly, as shown in FIG. 3 of the drawing, into the solenoid 44 so as to remove it from engagement with solenoid valve body 48, and thereby first and second passageways 52 and 54 are open to each other as shown by curved arrow 55 and rendered in communication with each other by means of a third passageway 56 so that water can flow from upper chamber 39 through first passageway 52, through third passageway 56 and thence into second passageway 54 and into outlet 14. This reduces the pressure in chamber 39 and relieves the pressure balance in chamber 39 so that the pressure on diaphragm 22 from chamber 38 is greater than the pressure from chamber 39. Plunger 46 is retained in its elevated position for a predetermined period of time in accordance with a pre-set time of flush which can be pre-set in the electronic circuitry. After the pre-set period of time, plunger 46 drops due to gravity to close off the connecting passageway 56.

Solenoid 44 in operation is controlled by and rendered operative by means of an infra-red sensor mechanism 57 which includes an infra-red transmitter 58 and an infra-red receiver 59. Positioned in front of infra-red transmitter 58 is an infra-red filter 60 and positioned in front of infra-red receiver 59 is an infra-red filter 61. The infra-red transmitter 58 and infra-red receiver 59 are connected with circuitry 62 shown schematically which renders plunger 46 moveable in response to the energization of solenoid 44.

The infra-red transmitter 58 and infra-red receiver 59 including the schematic circuitry 62 associated therewith are held and supported by holder 64. While it is not an essential element of the invention, it is desired that the circuitry and the holder as well as the portions of the transmitter 58, receiver 59, and filters 60, 61 be potted as shown at 66 in FIG. 3, but omitted from other views for sake of clarity and held within electronic cover 40 so as to avoid any moisture contamination. Potting 66 may be a clear see-through type of plastic so that all internal parts are visible, and at the same time contamination from moisture is prevented. The potting compound can also be formed from a hard compound in which a block is formed from black epoxy or the circuit elements can be sprayed on with a clear material which also seals all of the elements.

The lower portion of lower holding portion 35 forms a water guide 68. The diaphragm bushing holder 34 is held to second holding portion 36 by the upper portion of guide 68 to sandwich the other end 37 of diaphragm 22 and, one side of guide 68 surrounds central opening 26. The other side of guide 68 includes four substantially equally spaced legs 70 extending transversely of the longitudinal axis of outlet 14 and in a direction along the transverse axis of inlet 12. The ends of legs 70 abut against side 71 of main valve seat member 32 and together therewith provide for passageways 74 for the flow of water from inlet 12 to outlet 14 when diaphragm 22 is moved away from seating portion 72 of main valve seat member. Main valve seat member 32 can if desired include peripherally spaced legs 70 projecting therefrom and cooperate with guide 68 to provide passageways 74. If main valve seat member 32 includes legs 70, then the legs abut against the guide 68 which forms a unitary member lower holding portion 35. What is important is that one or more passageways 74 be provided between guide 68 and side 71 of main valve seat member 32.

Main valve seat 32 is provided with the seating portion 72 on which diaphragm 22 normally sits in its closed position to seal off chambers 38 and 39 from each other, and to assure that diaphragm 22 is held against seating portion 72 by the water pressure in upper chamber 39.

Legs 70 are also used to provide alignment control for cylindrically-shaped guide 68 as it moves relative to main valve seat member 32 in a vertical or longitudinal direction axially of the longitudinal axis 15 of outlet 14 as shown in the drawing. Between each pair of adjacent legs 70, there is provided the water passageway 74 to permit water from inlet 12 and chamber 38 to flow to outlet 14 when the diaphragm 22 is shown in its raised or open position as shown in FIG. 4. Legs 70 guide the vertical movement of the upper holding portion 36 of diaphragm bushing holder 34 as diaphragm 22 moves in an upward direction axially along the longitudinal axis as shown by the arrow 15 to provide communication between inlet 12, lower chamber 38 and outlet 14 through channel 76 formed between seating portion 72 and diaphragm 22 when in its raised position as best seen in FIG. 4 to permit water to flow in the direction of arrows 78; channel 76 is in effect provided when diaphragm 22 is moved off seating portion 72 in an upward direction along longitudinal axis 15 away from seating portion 72. Below the legs 70, there is provided a conventional choke 80.

Water runs over seating portion 72 through water passageway 74 and thence through choke 80 to provide for continuous flow of water to outlet 14 as shown by arrow 81 so long as solenoid 44 is energized and plunger 46 is in its raised condition as shown in FIG. 4 and solenoid valve body 48 is in contact with the base of the plunger 46 to cut off flow of water in third passageway 56.

Valve body cover 18 includes a roof portion 82 having a central portion 84 forming the base 49 and leg portion 51, including a first opening 86 in base 49 in communication with first passageway 52, an outer circumferential extension 85 having at the end thereof sealing edge 19 to clamp one end 24 of diaphragm 22 between face plate or bearing plate 87, and a second opening 88 in base 49 in communication with second passageway 54 for receiving a mating portion 90 of solenoid valve body 48 both of which are provided with mating threaded portions 89, 91, respectively or any other suitable mating connectors. Extending from valve body cover 18 is a cylindrical member 92 which extends into diaphragm bushing holder 34 through the central opening in diaphragm 22 and passes through central opening 26.

To provide for a tight seal between cylindrical member 92 and second holding portion 36, cylindrical member 92 is provided on an outer circumferential portion thereof with a circumferential channel 93 to receive a cup washer 94. Cup washer 94 extends circumferentially about the outer peripheral extent of cylindrical member 92 and expands to create a tight seal as it expands between second holding portion 36 and cylindrical member 92. This cup washer 94 provides for a permanent separation between outlet 14 and upper chamber 39 while permitting second holding portion 36 to move axially along cylindrical member 92 in the direction of longitudinal axis 15.

Solenoid chamber O-rings 96 are also provided to provide a tight seal between valve body cover 18 and control module 20 and more specifically between solenoid valve body 48 and base 49 in central portion 84. Outer cover 40 of control module 20 may also is provided with a decorative front portion 98.

OPERATION

The flush valve is rendered operative when an object such as an individual is within the range of infra-red sensor mechanism 57 and a transmitted infra-red ray from infra-red transmitter 58 is reflected back from the object or person (not shown) when such object is within a preselected range or distance and is received by infra-red receiver 59, then solenoid 44 is rendered operative and plunger 46 is raised and moved in an upward direction longitudinally along axis 15 as shown in the drawing, and the first and second passageways 52, 54 respectively are rendered in communication through third passageway 56 (as best seen in FIG. 3) and the water in upper chamber 39 goes through the second passageway 54 into outlet 14.

Figure 2:
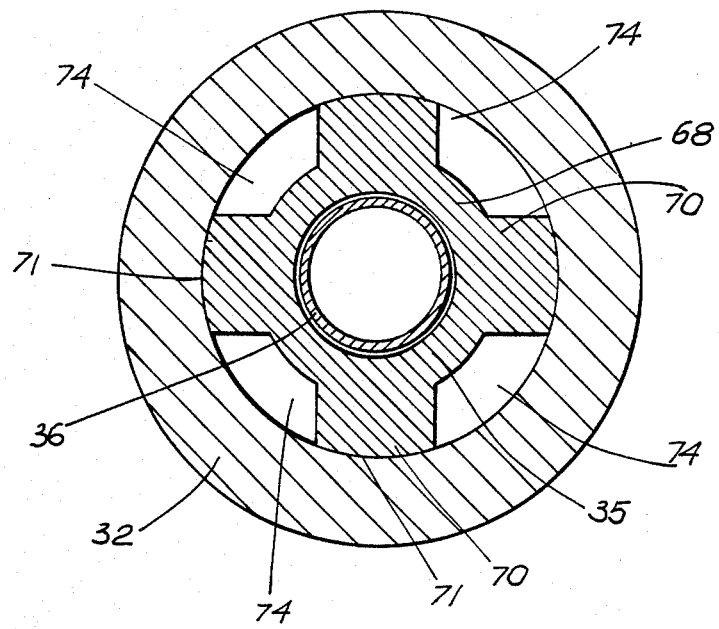
FIG. 2 is a sectional view taken on line 2—2 to show the water flow passageway from the inlet to the lower chamber and then to the outlet after the diaphragm has been moved off its seat.

Removal of the pressure in upper chamber 39 in response to energization of solenoid 44 renders the difference in pressure between upper chamber 39 and lower chamber 38 such that the pressure in upper chamber 39 is decreased and the diaphragm 22 then in response to pressure in lower chamber 38 and water supplied in inlet 12 is moved away from seating portion 72 and water then flows over seating portion 72 in the direction of arrow 78 through passageway or channel 76 from inlet 12 to outlet 14 and through water passageway 74 next to main valve seat member 32 (see FIG. 2).

Initially, when solenoid 44 is rendered operative to move plunger 46 in an upward direction water from second passageway 54 enters and goes to outlet 14.

Outer circumferential extension 85 of cover 18 is in contact with diaphragm 22 and holds the outer end of diaphragm 22 on face plate or bearing plate 87 of valve body 16, and diaphragm bushing holder 34 cooperates with seating portion 72 to hold diaphragm 22 in place and prevent flow of water from inlet 12 to outlet 14 and to permit flow of water when diaphragm 22 is moved off seating portion 72 when sensor activated to activate the flush valve to move plunger 46 and provide for flushing a urinal or water closet. The electronic module, solenoid and sensor to activate the flush valve are all contained in a single unit in control module 20 and are potted in potting 66 to prevent contamination by water and the outside environment.

Means, such as that known from Martin J. Laverty's U.S. patent application Ser. Nos. 035,887, filed Apr. 8, 1987 and 137,065 filed Dec. 23, 1987, are provided for preventing unwanted operation when the sensor mechanism 57 experiences a loss of current and then the current is subsequently restored. The sensor mechanism 57 includes a power on reset circuit that makes use of a resistor-capacitor network and a voltage threshold comparing device to create a time delay that will inhibit the operation of the flush valve for a nominal preselected time period when current is first supplied to the sensor. Thus, the sensor cannot activate if the user steps up to the unit and steps away for less than a preselected predetermined period of time.

One of the main features of the invention is to be able to take a standard manufacturers flush valve with standard or conventional internal working parts and replace only the cover to the flush valve. The replacement unit includes the valve body cover 18 and the outer cover 40 of control module 20 containing the solenoid 44, solenoid valve 42 and a decorative front portion 98 of the cover containing the sensor module or sensor mechanism 57. Electronic circuitry 62 of the low voltage type, twenty-four volts or less, is contained within unit for controlling the time the solenoid maintains the solenoid valve body 48 with plunger 46 away from the solenoid valve body 48 and in its open position, and the circuitry also includes means for controlling the length, duration and commencement time of flushing in response to the infra-red sensor mechanism 57.

The improved guide system for the diaphragm bushing holder together with the cup washer 94 to seal the upper chamber from the outlet of the flush valve, cooperate to provide for ease of flushing while permitting the diaphragm 22 to be moved from its open to its close position. The guide extends from the cover containing the solenoid valve with a passage to the outlet of the flush valve. The guide slides into the unmodified portion of the flush valves diaphragm assembly.

While there has been shown and described what is considered to be the preferred embodiments, various changes and modifications may be made therein without departing from the scope of the invention.

What is claimed is:

1. A sensor operated flush valve comprising:

a valve body having a water inlet and a water outlet;

a valve body cover for said valve body, said valve body cover having a U-shaped cup-shaped portion therein, and first and second openings in the base of said cup-shaped portion, said first opening being aligned with said water outlet;

cooperating means on said valve body and said valve body cover for holding said valve body cover to said valve body in a water-tight fitting relationship;

a diaphragm valve assembly including a diaphragm member and a main valve seat member having one end held in a fixed relationship between said valve body and said valve body cover for separating said inlet from said outlet, said diaphragm member having a central opening aligned with said first opening and said water outlet and defining another end, holding means coupled with said other end aligned with said other end controlling the movement thereof longitudinally of said water outlet, and by-pass means associated with said diaphragm member for permitting water under pressure supplied to said water inlet to pass from one side of said diaphragm to the other side thereof into said valve body cover;

said valve body cover including a guide element extending through said diaphragm assembly for permitting said diaphragm to slidably and sealingly engage said guide element during movement of said diaphragm assembly, said guide element defining said first opening;

a housing connected with said cover for containing a flush valve operating mechanism;

said flush valve operating mechanism comprising:

a solenoid valve apparatus housed within said housing and including a solenoid valve body element received within said cup-shaped portion having first and second passageways, said first and second passageways being aligned with said first and second openings;

said solenoid valve apparatus including in said housing a solenoid means supported on said solenoid valve body element and a reciprocable solenoid plunger movable within said solenoid means;

said solenoid plunger being associated with said solenoid valve body element and aligned therewith to overlie said first and second passageways and to close off said first passageway from said second passageway;

said second opening being displaced from said first opening and communicating with the interior of said cover away from said outlet and said other side of said diaphragm member;

said solenoid plunger cooperating with said solenoid valve body element and being movable relative thereto to close and to open said first and second passageways and to permit water to flow from said second to said first passageway upon activation of said solenoid means and to close off said first and second passageways from each other upon deactivation of said solenoid means for closing said diaphragm assembly, said plunger being raised upon activation of said solenoid means for opening said diaphragm assembly and upon deactivation thereof is moved by gravity into engagement with said solenoid valve body element to isolate said first and second passageways from each other; and activation means including circuitry contained within said housing responsive to an external stimulation including at least one of an infra-red sensor mechanism and external non-user control to activate said solenoid valve means to move said solenoid plunger and cause the water to flow from said second passageway into said first passageway and into said outlet and means for enclosing said circuitry to prevent moisture contamination thereof.

2. The flush valve of claim 1, wherein said activation means for activating said solenoid plunger includes an infra-red sensor mechanism.

3. The flush valve of claim 2, including electronic circuitry in said housing electrically coupling said infra-red sensor mechanism with said solenoid, and said enclosing means including material enclosing said circuitry in said housing to prevent contamination thereof.

4. The flush valve of claim 1, wherein:
said U-shaped cup-shaped portion is in a roof portion of said cover;
said guide element includes a hollow cylindrical member projecting from said roof portion in alignment with said U-shaped cup-shaped portion, said hollow cylindrical member having on an outer peripheral surface thereof a circumferential channel;
a circumferential cup washer held in said circumferential channel and extending between said channel and an outer surface of said holding means to provide a water-tight seal between said holding means and said cylindrical member; and
said holding means being movable longitudinally of said cylindrical member in response to water pressure in said inlet and activation of said solenoid.

5. The flush valve of claim 4, wherein:
said solenoid valve body element is receivable within said U-shaped member and is tightly fitted therein to provide a water-tight relationship therewith;
said plunger being movable in said U-shaped member towards and away from said first and second passageways for closing them off from each other and providing a third passageway within said U-shaped member between said valve body and said plunger;
energization of said solenoid means causing water from said upper chamber to flow through said third passageway into a longitudinal channel between said holding means and said valve body when said diaphragm member is lifted away from said main valve seat member.

6. The flush valve of claim 1, including O-rings on the base of said cup-shaped portion providing a water-tight seal between said solenoid valve body element and said U-shaped portion of said cover.

7. The flush valve of claim 1, including an infra-red sensing mechanism and a time delay activation circuit coupling said infra-red sensing mechanism to said solenoid means.

8. A replacement cover and control module unit for a flush valve, said unit comprising:

a cover member assembly including a cover portion and an electronic cover enclosing a control module unit, said cover portion being adapted to fit on a flush valve body, and said electronic cover and said control module unit being supported by said cover portion;

said cover portion having an U-shaped opening in the top thereof, a cylindrical portion projecting from said top juxtaposed to said U-shaped opening, a first opening in said U-shaped portion communicating with an inlet to said flush valve and a second opening in said U-shaped portion communicating with an outlet of said flush valve;

seal means associated with said cover portion and said cylindrical portion and said outlet for providing a water-tight seal between the outer surface of said cylindrical portion and said outlet; and said control module unit being adapted to fit over and supported on said cover portion and providing a water-tight relationship therewith, and containing a solenoid mechanism, and hands-free externally operated energization means for operating said solenoid mechanism when a human presence is detected;

a solenoid valve body receivable within said U-shaped opening;

said solenoid mechanism including a solenoid plunger associated with a solenoid aligned with said U-shaped opening and said solenoid valve body and movable between a first position closing off communication between said first and second openings through the intermediation of said solenoid valve body and a second position to provide communication through said solenoid valve body between said first and second openings; and said energization means upon activation thereof causing said solenoid plunger to move from said first position to said second position.

9. The unit as claimed in claim 8, wherein said seal means is a cup-shaped washer received within a channel on the outer surface of said cylindrical portion.

10. The unit as claimed in claim 8, wherein said valve body includes a first passageway communicating with said first opening and a second passageway communicating with said second opening; and said plunger in said first position isolating said first and said second passageways, and in a second position rendering said first and said second passageways in communication with each other.

11. The unit as claimed in claim 10, wherein:
said flush valve has a water inlet and a water outlet, a diaphragm with a bypass valve to separate said inlet from said outlet, and divide said inlet into a lower chamber and an upper chamber; and
said seal means includes a sealing edge at an outer rim of said cover for sealing one edge of the diaphragm between said cover and the flush valve body and cooperating with said cylindrical portion to seal said inlet from said outlet.

12. The unit as claimed in claim 10, wherein the flush valve includes a diaphragm bushing holder for holding one end of a diaphragm, said bushing holder including a lower holding portion and an upper holding portion for clamping therebetween said one end of said diaphragm and bypass valve means associated with said diaphragm to permit water to flow from one side of said diaphragm to the other and said flush valve including a sealing portion between said inlet and said outlet, said diaphragm cooperating with said sealing portion to seal said inlet from said outlet; and said energization means being effective to raise said plunger against gravity and decrease the water pressure on one side of the diaphragm to lift the diaphragm from said sealing portion and render said inlet and said outlet in communication with each other.

13. The unit as claimed on claim 12, wherein said seal means includes a cup-shaped washer in engagement with a longitudinal side of said upper holding portion to seal the upper chamber from said outlet and to guide the longitudinal movement of said cup-shaped member.

14. The unit as claimed in claim 8, wherein said hands-free externally operated energization means is a sensor mechanism responsive to user activation thereof.

15. The unit as claimed in claim 8, wherein said hands-free externally operated energization means includes external controls free of user operation for energization of said solenoid.

16. The unit as claimed in claim 8, wherein said hands-free externally operated energization means includes an infra-red sensor mechanism, said solenoid and electrical circuitry coupling said infra-red sensor mechanism to said solenoid for electrical energization thereof to move said plunger against gravity and to render said first and said second openings in communication with each other.

17. The replacement cover and control module unit for a flush valve as claimed in claim 8, including infra-red sensor mechanism and electronic circuitry means housed in said electronic cover.

18. A sensor operated flush valve comprising:
a valve body having a water inlet and a water outlet;
a valve body cover for said valve body, said valve body cover including a roof portion having first and second openings, said frist opening being substantially aligned with said water outlet;
cooperating means on said valve body and said valve body cover for holding said valve body cover to said valve body in a water-tight fitting relationship;
a diaphragm valve assembly including a diaphragm member and a main valve seat member having one end held in a fixed relationship between said valve body and said valve body cover for separating said inlet from said outlet, said diaphragm member having a central opening substantially aligned with said first opening and said water outlet and defining another end, holding means coupled with said other end aligned with said other end controlling the movement thereof longitudinally of said water outlet, and by-pass means associated with said diaphragm member for permitting water under pressure supplied to said water inlet to pass from one side of said diaphragm to the other side thereof into said valve body cover;
said valve body cover including a guide element extending through said diaphragm assembly for permitting said diaphragm to slidably and sealingly engage said guide element during movement of said diaphragm assembly, said guide element defining said first opening;
a housing connected with said cover for containing a flush valve operating mechanism;

said flush valve operating mechanism comprising:
a solenoid valve apparatus housed within said housing and including a solenoid valve body element cooperating with said roof portion and having first and second passageways, said first and second passageways being aligned with said first and second openings, respectively;
said solenoid valve apparatus including in said housing a solenoid means supported on said solenoid valve body element and a reciprocable solenoid plunger movable within said solenoid means;
said solenoid plunger being associated with said solenoid valve body element and aligned therewith to overlie said first and second passageways and to close off said first passageway from said second passageway;
said second opening being displaced from said first opening and communicating with the interior of said cover away from said outlet and said other side of said diaphragm member;
said solenoid plunger cooperating with said solenoid valve body element and being movable relative thereto to close and to open said first and second passageways and to permit water to flow from said second to said first passageway upon activation of said solenoid means and to close off said first and second passageways from each other upon deactivation of said solenoid means for closing said diaphragm assembly, said plunger being raised upon activation of said solenoid means for opening said diaphragm assembly and upon deactivation thereof is moved by gravity into engagement with said solenoid valve body element to isolate said first and second passageways from each other; and
activation means including circuitry contained within said housing responsive to an external stimulation including at least one of an infra-red sensor mechanism and external non-user control to activate said solenoid to move said solenoid valve means plunger and cause the water to flow from said second passageway into said first passageway and into said outlet and means for enclosing said circuitry to prevent moisture contamination thereof.

19. The flush valve of claim 18, wherein:
said guide element includes a hollow cylindrical member projecting from said roof portion in alignment with said outlet, said hollow cylindrical member having on an outer peripheral surface thereof a circumferential channel;
a circumferential cup washer held in said circumferential channel and extending between said channel and an outer surface of said holding means to provide a water-tight seal between said holding means and said cylindrical member; and
said holding means being movable longitudinally of said cylindrical member in response to water pressure in said inlet and activation of said solenoid.

20. The flush valve of claim 18, wherein said activation means for activating said solenoid plunger includes:
infra-red sensor mechanism means isolated from said flush valve; and
electronic circuitry means electrically coupling said infra-red sensor means with said solenoid.

* * * * *